US006781582B1

(12) United States Patent
Van Rens

(10) Patent No.: US 6,781,582 B1
(45) Date of Patent: Aug. 24, 2004

(54) MESH GENERATOR FOR AND METHOD OF GENERATING MESHES IN AN EXTRUSION PROCESS

(75) Inventor: Bas Jan Emile Van Rens, Son (NL)

(73) Assignee: Alcoa Nederland B.V. (NL)

( * ) Notice: Subject to any disclaimer, the term of this patent is extended or adjusted under 35 U.S.C. 154(b) by 0 days.

(21) Appl. No.: 10/169,472

(22) PCT Filed: Dec. 27, 1999

(86) PCT No.: PCT/NL99/00808
§ 371 (c)(1),
(2), (4) Date: Jun. 27, 2002

(87) PCT Pub. No.: WO01/48699
PCT Pub. Date: Jul. 5, 2001

(51) Int. Cl.[7] .............................................. G06T 17/00
(52) U.S. Cl. ...................................... 345/420; 345/423
(58) Field of Search ................................ 345/420, 419, 345/421, 424, 423, 425, 441; 382/125, 126

(56) References Cited

U.S. PATENT DOCUMENTS

| 4,218,619 A | * | 8/1980 | Yang et al. | 378/31 |
| 6,266,062 B1 | * | 7/2001 | Rivara | 345/419 |
| 6,392,646 B1 | * | 5/2002 | Yamrom et al. | 345/420 |
| 6,587,104 B1 | * | 7/2003 | Hoppe | 345/423 |

FOREIGN PATENT DOCUMENTS

EP 0 893 773 A 1/1999

OTHER PUBLICATIONS

Van Rens B J E; Brekelmans W A M Baaijens F P T Second Euro–Conference on Parallel and Distributed Computing for Computational Mechanics Apr. 1998 , pp. 25–31.

Van Rens B J E; Brokken D; Brekelmans W A M; Baaijens F P T Engineering with Computers 1998; vol. 14, pp. 248–259.

* cited by examiner

Primary Examiner—Mark Zimmerman
Assistant Examiner—Huedung X. Cao
(74) Attorney, Agent, or Firm—Webb Ziesenheim Logsdon Orkin & Hanson, P.C.

(57) ABSTRACT

A computer arrangement and a method for generating meshes of an object having an object volume within a shape defined by a front surface, a rear surface and an envelope surface in accordance with the following steps: (a) receiving input data regarding a set of line sections; (b) defining a circle with a radius $L_{circ}$ just large enough to enclose an outer contour of a front surface cross-section; (c) dividing each of the line sections into a number of consecutive line elements connected by nodes in accordance with equation: (1), where: $n_{el}(n)$=number of line elements of line section $25(n)$, $L_{sect}(n)$=length of line section $25(n)$, $c_1$, $c_2$=predetermined constants; (d) generating front surface meshes; (e) copying the front surface meshes to the rear surface; (f) generating envelop surface meshes for the envelop surface; (g) generating a volume mesh for the object volume.

21 Claims, 11 Drawing Sheets

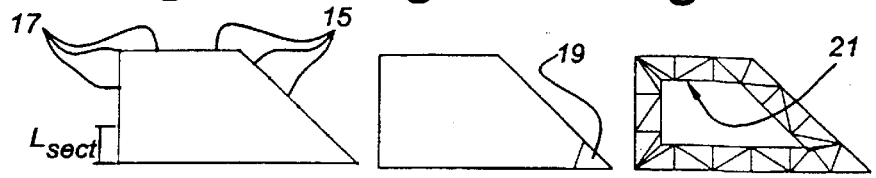
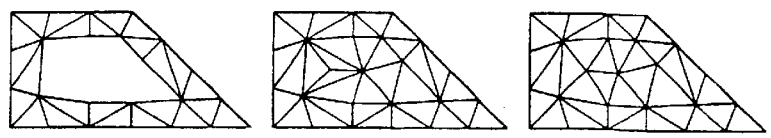
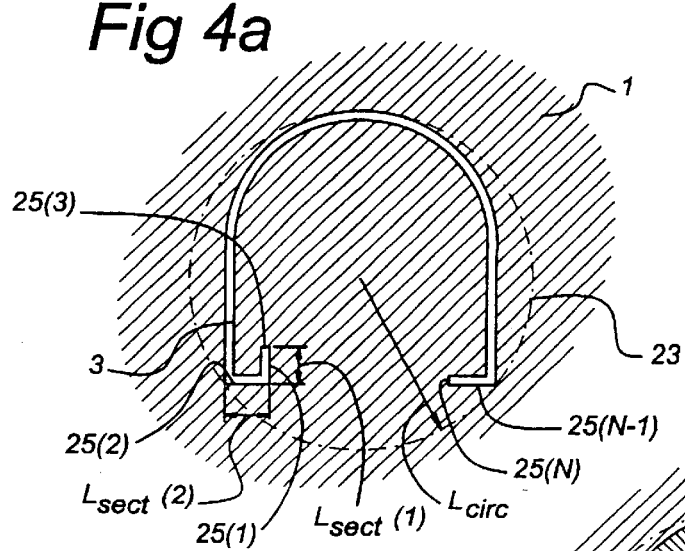
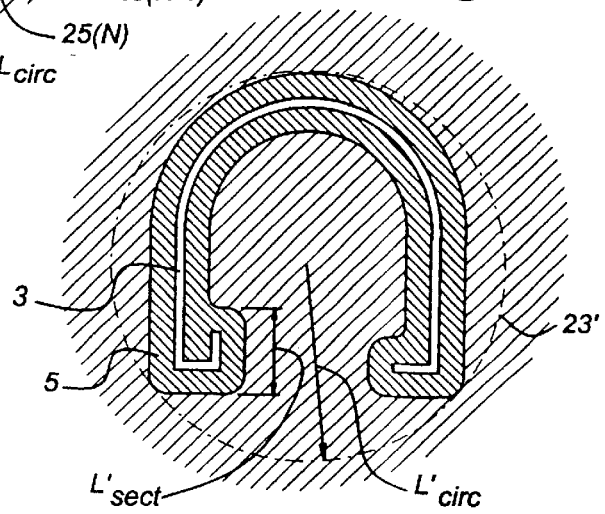

Fig 8
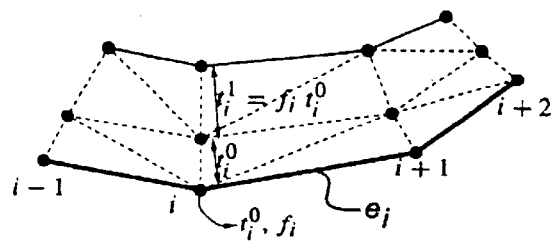
Fig 9a             Fig 9b
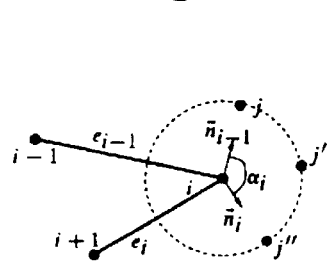    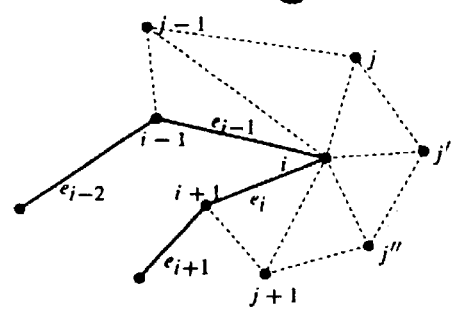
Fig 10
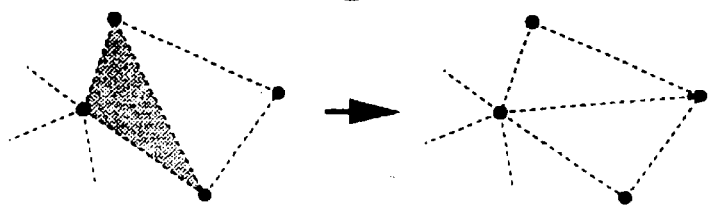
Fig 11
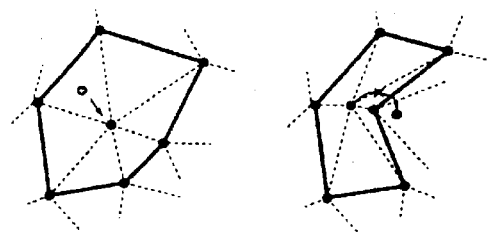

Fig 12a
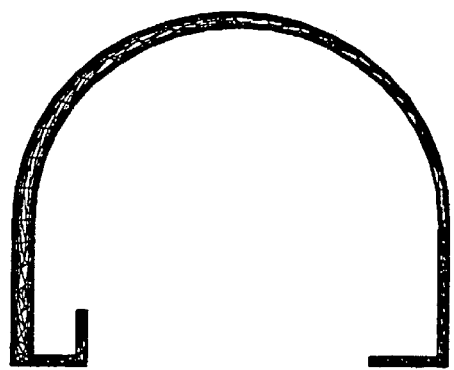
Fig 12b
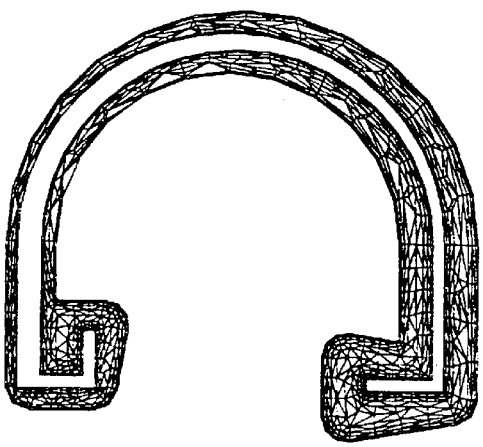
Fig 12c
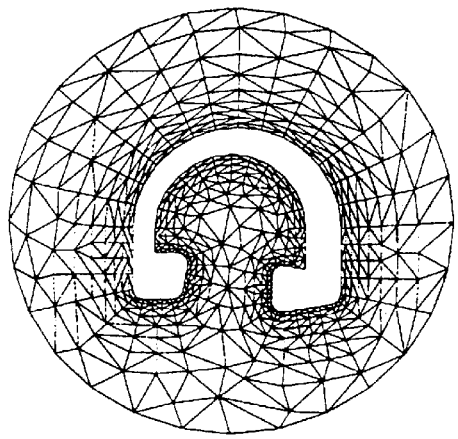
Fig 12d
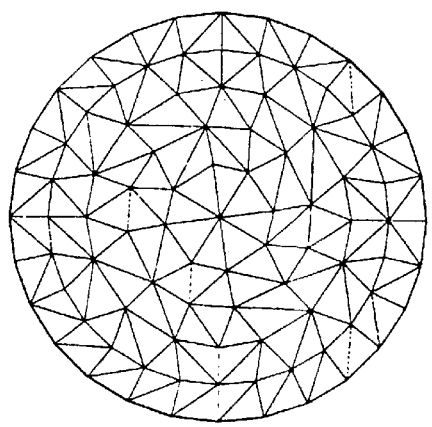
Fig 13
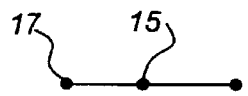
Line elements
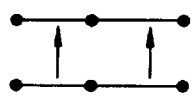
Translate
Quadrilaterals
triangles Triangle    Translate    Prism Prism    Diagonals    8 tetrahedra    3 tetradedra

MESH GENERATOR FOR AND METHOD OF GENERATING MESHES IN AN EXTRUSION PROCESS

FIELD OF THE INVENTION

The present invention relates to the field of finite element simulation of extrusion processes.

It is to be understood that, although the description to follow mainly refers to aluminum as the extrusion material the principles of the present invention are equally applicable to other fields of extrusion, like polymer extrusion.

DESCRIPTION OF THE PRIOR ART

In the field of extrusion processes, algebraic equations are necessary to allow calculation of shapes of extrusion profiles. Chapters 1, 2 and 3 of B. J. E. van Rens, "Finite element simulation of the aluminum extrusion process", thesis, Technical University Eindhoven, 1999, present systems of equations, for instance, those resulting from the conservation laws for mass, momentum and energy.

To arrive at these systems of algebraic equations, it is crucial that spatial discretizations of the relevant domains are available. However, the generation of these discretizations, from now on referred to as meshes, poses an enormous challenge due to the complex shapes that are associated with (aluminum) extrusion. As a result, existing meshing methods of the prior art either fail or generate an unacceptably large number of elements for these complex domains. Therefore, new, dedicated meshing algorithms have been presented by the inventor Van Rens in his thesis referred to above that generate meshes with which the solution field can be captured accurately while the number of elements is kept to a minimum. To make these dedicated algorithms as robust and flexible as possible they are restricted to the generation of triangular surface and tetrahedral volume elements.

Chapter 4 of Van Rens discloses algorithms that can be used by a computer system to generate meshes for the entire system of extrusion product and extrusion tool. In chapter 4.1.1 it is suggested that data from a Computer Aided Design (CAD) package with which the die has been designed can be used as input data for the mesh generator. However, it is not disclosed how this can be accomplished.

SUMMARY OF THE INVENTION

The present invention elaborates on the principles as explained in chapter 4 of the thesis of Van Rens, referred to above. The object of the invention is to provide a method and an arrangement for fully automatic mesh generation of the domains associated with the extrusion tools and the extrusion material in an extrusion process when the contours describing the cross-sections of the extrusion tools and the extrusion material are defined.

To that end, the present invention is directed to a computer arrangement for generating a mesh structure for an object, the object having an object volume enclosed by a front surface, a rear surface and an envelop surface, the front surface having a front surface cross-section and the rear surface having a rear surface cross-section substantially identical to the front surface cross-section, the computer arrangement being arranged for:

(a) receiving input data regarding a set of line sections together defining the front surface cross-section;

(b) defining a circle with a radius $L_{circ}$, said radius $L_{circ}$ being just large enough to enclose an outer contour of the front surface cross-section;

(c) dividing each of the line sections into a number of consecutive line elements connected by nodes in accordance with the following equation:

$$n_{el}(n) = \left(c_1 \cdot \frac{L_{sect}(n)}{L_{circ}}\right)^{c_2} \tag{1}$$

where:
$n_{el}(n)$=number of line elements of line section 25(n) (n=1, 2, . . . , N)
$L_{sect}(n)$=length of line section 25(n)
$c_1$=a first predetermined constant
$c_2$=a second predetermined constant (d) generating a front surface mesh using the line elements and nodes generated in step (c);

(e) copying the front surface mesh to the rear surface to generate a rear surface mesh;

(f) generating an envelop surface mesh for the envelop surface such that the envelop surface mesh is conform with the front surface mesh and with the rear surface mesh;

(g) generating a volume mesh for the object volume such that the volume mesh is conform with the front surface mesh, the rear surface mesh and the envelop surface mesh.

In another embodiment, the invention relates to meshing of a plurality of objects. Then the invention relates to a computer arrangement for generating a mesh structure for a plurality of objects including at least a first and a last object, each object having an object volume defined by a front surface, a rear surface and an envelop surface, the front surface having a front surface cross-section and the rear surface having a rear surface cross-section substantially identical to the front surface cross-section, the computer arrangement being arranged for:

(a) receiving input data regarding a set of line sections together defining the front surface cross-section of the first object;

(b) defining a circle with a radius $L_{circ}$, said radius $L_{circ}$ being just large enough to enclose an outer contour of the front surface cross-section of the first object;

(c) dividing each of the line sections into a number of consecutive line elements connected by nodes in accordance with the following equation:

$$n_{el}(n) = \left(c_1 \cdot \frac{L_{sect}(n)}{L_{circ}}\right)^{c_2} \tag{1}$$

where:
$n_{el}(n)$=number of line elements of line section 25(n) (n=1, 2, . . . , N)
$L_{sect}(n)$=length of line section 25(n)
$c_{el}$=a first predetermined constant
$c_2$=a second predetermined constant (d) generating front surface meshes for the first object using the line elements and nodes generated in step (c);

(e) copying front surface meshes of the first object to the rear surface of the first object to generate a rear surface mesh;

(f) generating an envelop surface mesh for the envelop surface of the first object such that the envelop surface mesh is conform with the front surface mesh and with the rear surface mesh of the first object;

(g) generating a volume mesh for the object volume of the first object such that the volume mesh is conform with the front surface mesh, the rear surface mesh and the envelop surface mesh of the first object;

(h) repeating steps (a) through (g) for those surfaces and volumes of all other objects not already meshed, such that meshes generated for volumes of different objects and located on interface surfaces between these volumes are conform.

In both these embodiments, automatically determining the line elements and nodes in this way may be done by the computer arrangement in a time frame of only minutes, whereas doing it manually may take hours, sometimes even weeks. In extrusion processes, the contours describing the cross-sections of the extrusion material inside and outside the extrusion tool may be manually input to the computer arrangement. This may took some hours. However, in a very advantageous embodiment, the input comprises line and curve segments from CAD data that defines the extrusion tool design. These data may be electronically available and, thus, electronically supplied to the computer arrangement, thus shortening the time to calculate meshes for extrusion arrangements significantly, e.g., to a few seconds.

The methods as referred to may advantageously be used when simulating with the computer arrangement physical behavior of the object(s) using a finite element analysis.

BRIEF DESCRIPTION OF THE DRAWINGS

FIGS. 3a through f show a principle of paving;

FIGS. 4a and 4b show cross-sections through the bearing of a die tool and the pocket of the die tool, respectively, to illustrate how input data regarding the cross-section of the die package can be used for automatic mesh generation;

FIG. 8 shows line elements and nodes for various layers during mesh generation;

FIGS. 9a and 9b show how additional nodes and triangles may be inserted during mesh generation;

FIG. 10 shows flipping of an element with a bad corner;

FIG. 11 shows how only nodes inside convex polygons are shifted;

FIGS. 12a through 12d show cross-section meshes for different parts of the die tool;

FIG. 13 shows the generation of triangles when generating envelop surface meshes;

FIGS. 20a through 20f show a volume mesh of a die package as well as a cross-section through the die package;

DESCRIPTION OF PREFERRED EMBODIMENT

Figure 1:
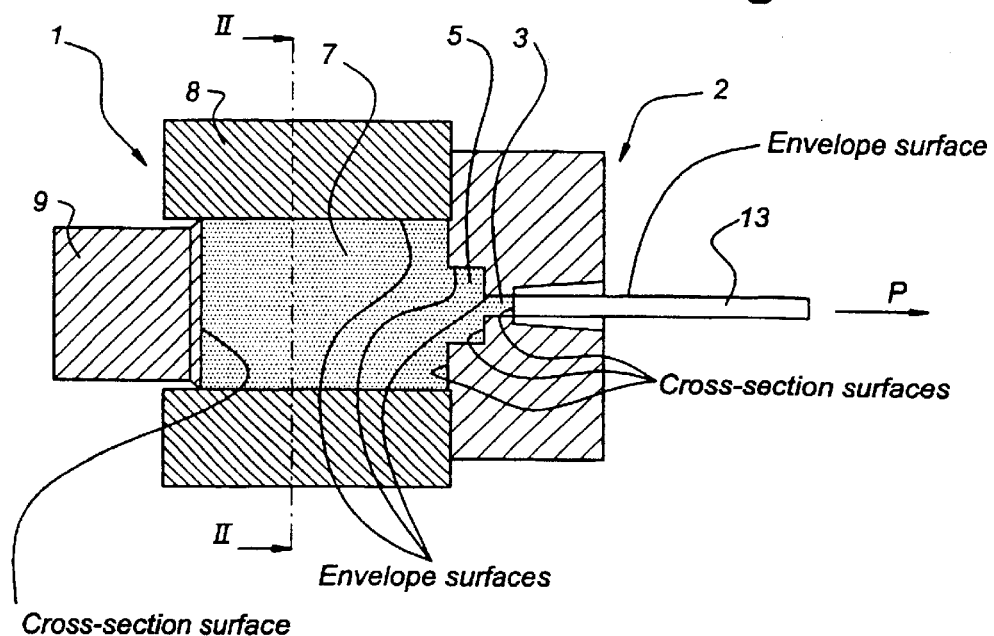
FIG. 1 shows a cross-section of a die tool.

For a standard flat profile two types of surfaces define the shape of the die and thus of the aluminum domain. This is further explained in FIG. 1 that shows an extrusion tool 1 in accordance with the prior art. The extrusion tool 1 comprises a die 2 enclosing a bearing section 3 and a pocket section 5. At its rear side the die 2 is connected to a container 8 in which a billet 7 (for instance fluid aluminum heated to about 480° C.) may be present. A ram 9 is slidably provided within the container 8 to push the billet 7 in an extrusion direction P. An extrusion profile 13 ("outflow") extends from the bearing 3.

It is observed that FIG. 1 is very schematic. Actually, the extrusion profile 13 may have a very complex shape and thus the cross-sections of the extrusion profile 13, the bearing 3 and the pocket 5 may have other, more complex forms.

The first type of surface is oriented perpendicular to the extrusion direction P and will be referred to as "cross-section surfaces". Surfaces of the second type are tangential to the extrusion direction P and will be called "envelope surfaces". The cross-section surfaces of the aluminum, i.e., from the billet 7 to the extrusion profile 13, are fully defined by the contours that define the extrusion tool, i.e. those related to the container 8, the pocket 5 and the bearing 3. The envelope surfaces are defined by these cross-sectional contours, combined with the lengths of the container 8, the pocket 5, the bearing 3 and the extrusion profile 13. It should be noted that the length of the bearing 3 can vary along its contour and that the length of the container 8 is determined by the ram 9 position.

Before a 3D volume mesh of the aluminum can be generated, the enclosing surfaces have to be meshed. Therefore, first the methods that have been devised to mesh the surfaces are discussed, where the generation of the cross-section meshes and the envelope meshes will be considered separately. This is followed by the method that has been developed to mesh the pocket 5, the bearing 3 and the extrusion profile 13 volumes. Thereafter, the method that is adopted to discretize the billet 8 volume is explained and finally the attention is focused on the meshing of the die.

As a first step volume meshes will be created with a constant bearing length. In extrusion practice, however, the bearing length varies. The mesh obtained in the first step is therefore adapted by local stretching to account for the varying bearing length. The methods used to adapt the mesh are described in detail below.

The geometry of the aluminum domain associated with a hollow profile is too complex to be fully captured using cross-section and envelope surfaces. The additional operations that have been designed to capture these complex shapes in the discretization of the aluminum will be discussed last.

1 Meshing the Surfaces—Paving Generator

Apart from the description related to FIGS. 4a, 4b, 5, and 6, the description to follow is largely identical to chapter 4 of the thesis of Van Rens referred to above.

Figure 2:
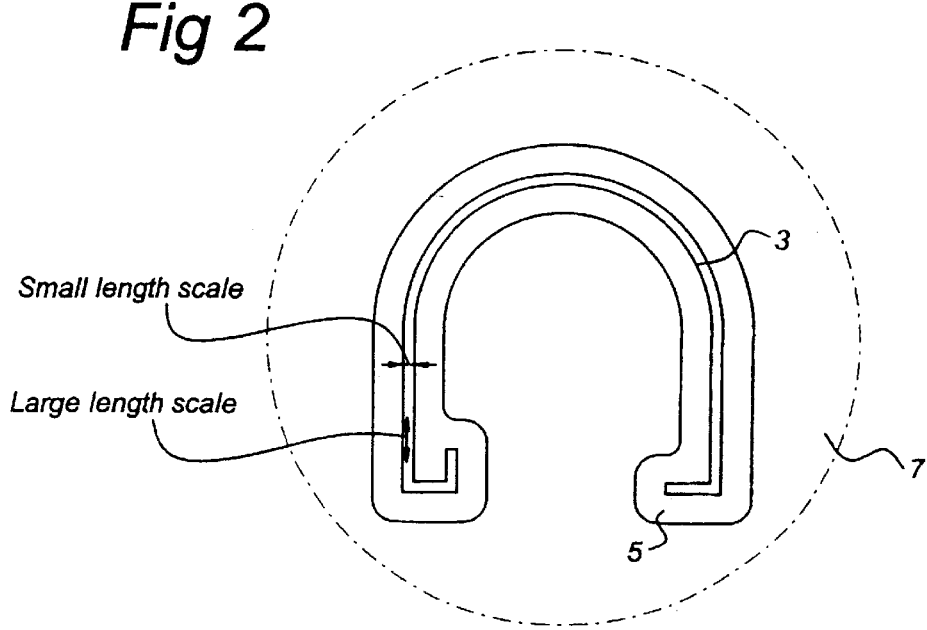
FIG. 2 shows a cross-section of a die tool for a relatively simple profile.

Extrusion profiles are often thin walled, which implies that the flow through the cross-section is characterized by different length scales; the length scale in the direction of the profile wall is much larger than that perpendicular to the wall. This explained in FIG. 2 which shows a cross section view to the bearing 3 and the pocket 5 as seen from the billet 7 (schematically indicated by II—II in FIG. 1). Therefore, the cross-section mesh should be directionally refined perpendicular to the profile wall. Several methods exist to generate directionally refined meshes for domains as depicted in FIG. 2. These methods can be split into mapped and unstructured procedures. Here an unstructured mesh generator is applied because it is more suitable for complex domains.

Unstructured mesh generators can globally be split up into two classes, Delaunay triangulation type generators (Zheng et al., 1996) and paving or plastering generators (Blacker and Stephenson, 1991). Delaunay type generators construct grids between just the boundary nodes of the domain. Since this often generates very low-quality elements, points are added to the interior of the domain in order to meet quality criteria for the mesh. Directionally refined meshes can be generated by defining different quality criteria for different directions (Gobeau et al., 1995). However, for complex geometry's the direction of the refinement varies throughout the domain, which makes the definition of the refinement direction rather cumbersome. Paying generators, on the other hand, add the elements by proceeding along the boundary between the gridded and the ungridded part of the domain, adding one element layer at a time (see FIGS. 3a through 3f). An advantage of paving, as it has been indicated in (Van Rens et al., 1998g), is that the thickness of each layer can be controlled to render directionally refined meshes. Therefore a paving algorithm is used.

As can be seen in FIGS. 3a–3f, the paving algorithm consists of the following steps (van Rens et al., 1998c):

(a) Process the input data (FIG. 3a); line elements 15 and nodes 17 are defined;
line elements have a length $L_{sect}$
Repeat
 (b) Generate triangles 19 using existing nodes on the current boundary (FIG. 3b)
 (c) Add a layer 21 of quadrilaterals and split into triangles (FIG. 3c)
 (d) Merge nodes on the new boundary that are close (FIG. 3d)
 (e) Until entire domain is meshed (FIG. 3e)
(f) Smooth the mesh to improve the element geometry (FIG. 3f)

In the following each of these steps will be discussed briefly.

1.1 Input Data

The input for a paver consists of the discretized boundaries of the domain and a measure for the thickness of the first layer of elements to be generated. Additionally an evolution or growth factor is used to indicate how this thickness should evolve during the paving process. In a preferred embodiment, the discretized boundaries are obtained (almost) directly from a Computer Aided Design (CAD) package with which the die 2 has been designed. The thickness and the growth factor are then the only parameters that have to be supplied for each contour that defines the die.

How CAD (or manually input) data can be used to automatically generate meshes for all parts, including the aluminum within and outside the extrusion tool 1 and all tool parts, is explained with reference to FIGS. 4a and 4b.

FIG. 4a shows a cross section through the bearing 3 for the simple profile of FIG. 2. The bearing 3 is surrounded by the (solid) material of the die 2. In many occasions, the data available from a CAD package is 2D data and comprises sections that may be straight or curved. These sections together define the die package. The curved sections may be parts of a circle. FIG. 4a shows such sections 25(n), n=1, 2, 3, . . . , N. Each of the sections have a section length $L_{sect}$(n), the value of which may differ per section. Of course, instead of 2D CAD data, 3D CAD data may be used if available.

Figure 5:
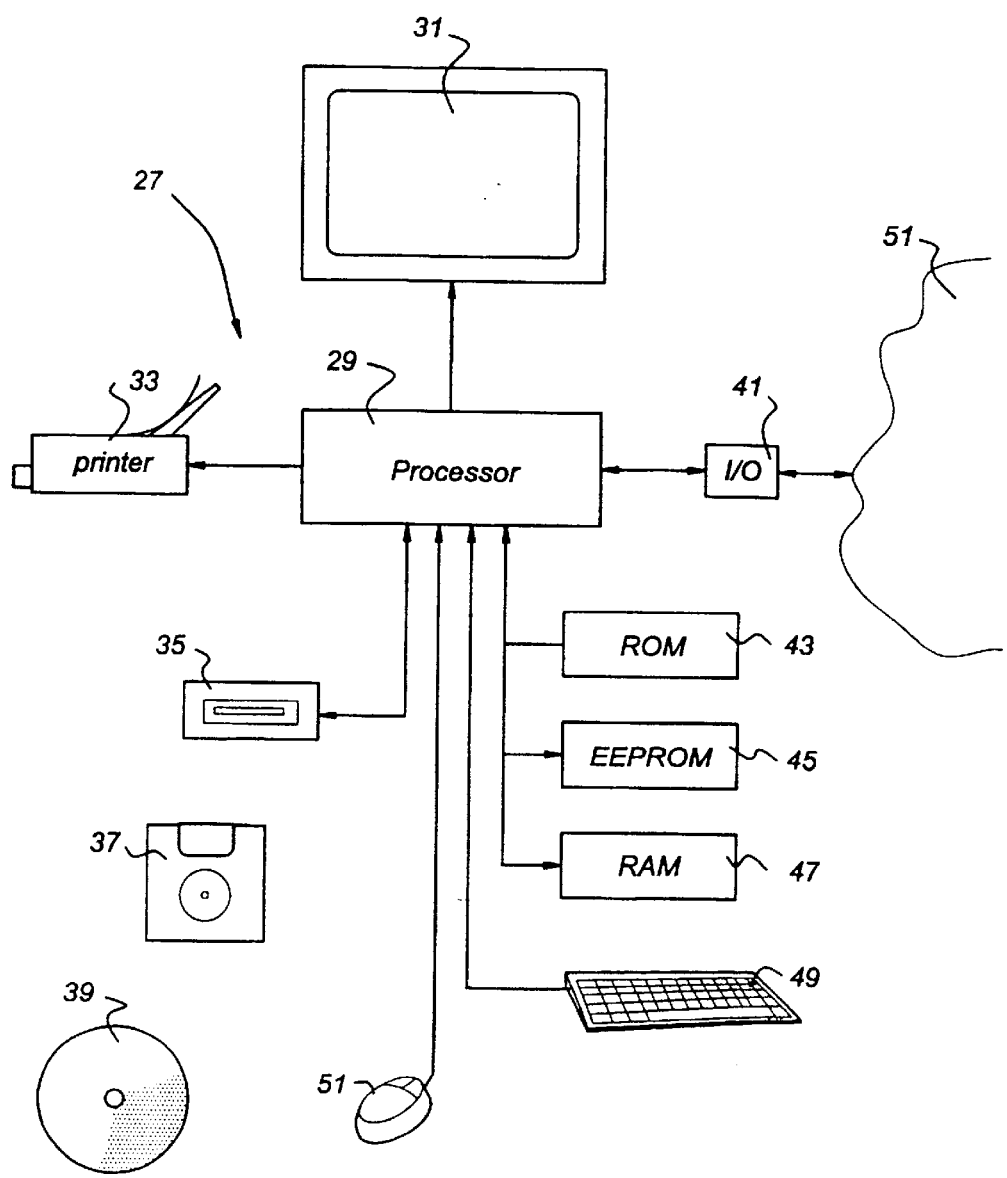
FIG. 5 shows a computer arrangement that can be used as a mesh generator.

In a first step, each of the sections 25(n) are divided into several line elements 15 connected to one another via nodes 17 (FIG. 3a). After that, these sections can be directly used as starting contours in the meshing algorithm running on a computer arrangement. FIG. 5 shows an example of a computer arrangement 27 that can be used for all calculating purposes.

The computer arrangement 27 comprises a processor 29 connected to a monitor 31, a printer 33, data carrier I/O means 35 (I/O=input/output), I/O means 41, ROM (read only memory) 43, EEPROM (electrically erasable read only memory) 45, RAM (random access memory) 47, a keyboard 49, and a mouse 51. Other components may be connected to the processor 29 as well, as is known to persons skilled in the art.

The data carrier I/O means 35 are arranged for receiving a data carrier, e.g., a floppy disk 37, a CDROM 39, etc., and for reading data from and possibly writing data to the data carrier, as instructed by the processor 29.

The I/O means 41 are arranged as intermediary between the processor 29 and a communication network 51 that may, e.g., be the PSTN (public switched telephone network) or the Internet.

The processor 29 is drawn as one single block However, it may be implemented as several parallel operating processors for performing several sub-tasks in parallel which, by the way, would enhance calculation speed significantly. Moreover, the processor (or some of the sub-processors) may be physically located elsewhere. The single block 29 is only intended to indicate that there must be provided some intelligence somewhere to carry out predetermined calculation tasks. It may be implemented in any way known to persons skilled in the art.

Also the memory blocks 43, 45, 47 need not be restricted to those shown in FIG. 5. There may be more memories for storing databases, etc. They may also be located remotely from the arrangement shown.

FIG. 4a shows a circle 23 having a diameter with length $L_{circ}$ just large enough to entirely enclose the outer contour of the bearing 3. Each of the sections 25(n) is divided into a number of line elements 15. The number of line elements $n_{el}$(n) for line section 25(n) is computed in accordance with the following equation:

$$n_{el}(n) = \left(c_1 \cdot \frac{L_{sect}(n)}{L_{circ}}\right)^{c_2} \tag{1}$$

where $c_1$ and $c_2$ are constants with predetermined values. Preferably, $c_1$ is between 10 and 200 and $c_2$ is between 0.5 and 1.0. For example, $c_1$=50 and $c_2$=0.75. Moreover, $n_{el}$>1, and if $n_{el}$ as calculated by equation (1) is not an integer value it is made equal to the next higher integer value. By applying equation (1) and these further rules, the number of line elements 15 per section is known and the nodes 17 can be located on the sections 25(n).

As will be explained in detail below, the meshing generator as running on the computer arrangement of FIG. 5

(the program being for instance stored in EEPROM 45), calculates meshes for the entire system including the extrusion tool components and the aluminum starting with these line elements 15 as input.

Figure 6:
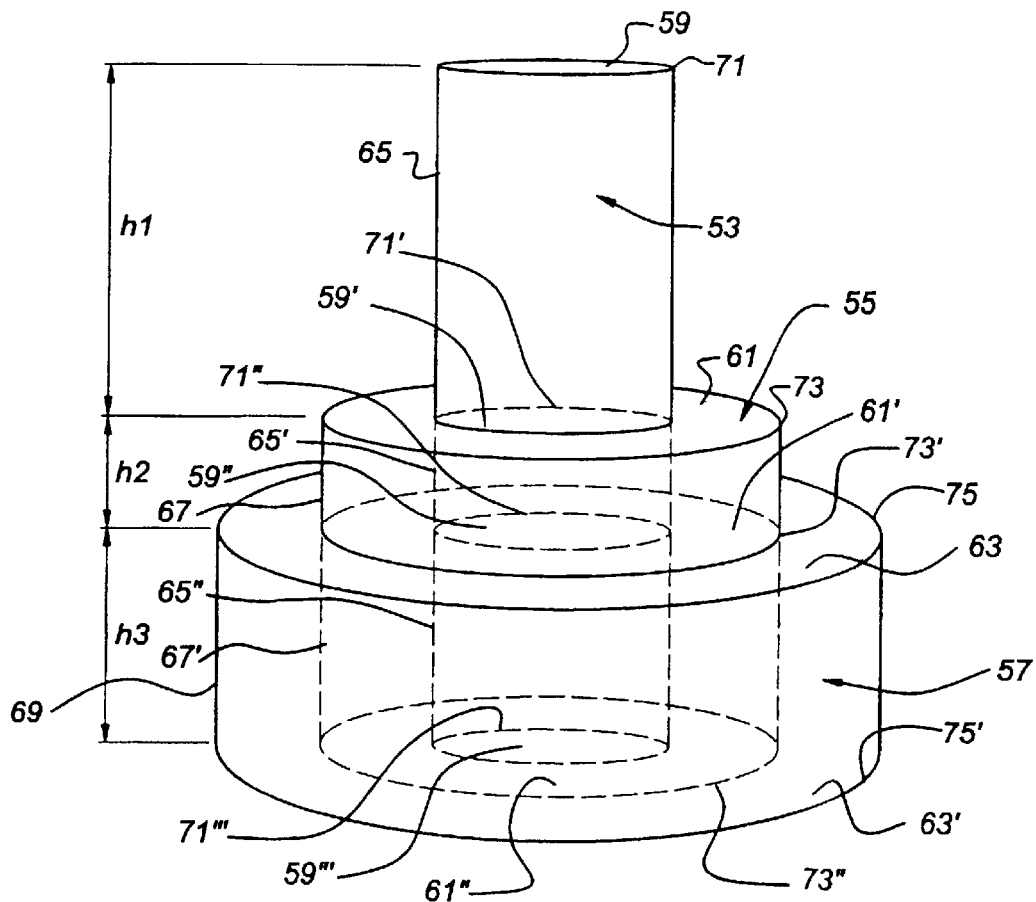
FIG. 6 shows an example of the definition of surfaces and volumes of different objects to be meshed.

The steps to be carried out by the mesh generator will be briefly explained with reference to FIG. 6. FIG. 6 shows, as an example, three coaxial tubes 53, 55, 57. Tubes 53, 55, and 57 correspond to the bearing, the pocket and the billet, respectively, assuming circular cross sections for simplicity, here.

The first tube 53 has a front cross-sectional surface 59 enclosed by an outer contour 71.

The second tube 55 has a front cross-sectional surface 61 with an outer contour 73 and an inner contour 71'. The inner contour 71' is a projection of contour 71 of front surface 59 of tube 53 on the plane in which contour 73 is located.

The third tube 57 has a front cross-sectional surface 63 with an outer contour 75 and an inner contour 73'. The inner contour 73' is a projection of contour 73 of front surface 61 of second tube 55 on the plane in which contour 75 is located.

The first, second and third tubes 53, 55, and 57 have respective rear surfaces 59''', 61'', and 63' all located in the same plane which is determined by the rear surface of the third tube 57. The rear surface of the third tube 57 is defined by an outer contour 75' and inner contour 73''. The inner contour 73'' is a projection of contour 73 of front surface 61 of second tube 55 on the plane in which contour 75' is located.

The tube 53 has envelop surfaces 65, 65' (within tube 55), and 65'' (within tube 57). The height of tube 53 is h1+h2+h3.

The tube 55 has envelop surfaces 67 and 67' (within tube 57). The height of tube 55 is h2+h3.

The tube 57 has an envelop surface 69. The height of tube 57 is h3.

For purposes of the mesh generation, a projection surface 61' of surface 61 on the plane in which the front surface 63 of the third tube 57 is located, as well as projection contours 71'' and 71''', respectively, of the outer contour 71 of front surface 59 of the first tube 53 are defined. Projection contour 71'' is located in the plane in which the front surface of tube 57 is located. Projection contour 71''' is located in the plane in which the rear surface of tube 57 is located.

In most situations, contours 71, 73, and 75 will not be circularly shaped but will be determined by the cross section contours of the extrusion tool components.

Basically, the steps of the mesh generator to calculate the meshes for the entire structure can now be summarized as follows:

(a) generate a cross-sectional surface mesh for cross-sectional surface 59 starting from contour 71 with line elements on contour 71 as determined with equation (1);

(b) copy mesh from step (a) to cross-sectional surfaces 59', 59'', and 59''';

(c) generate envelop surface meshes for envelop surface 65, as well as for the envelop surfaces 65' and 65'' of the extensions, respectively, of tube 53 within tubes 55 and 57, respectively; after step (c), the meshes of cross-sectional surfaces 59, 59', 59'', 59''', and envelop surfaces 65, 65', and 65'' need to be conform; i.e., nodes located on the boundaries between the envelop surfaces 65, 65', 65'' and cross-sectional surfaces 59, 59', 59'', and 59''' coincide for the respective envelop surface meshes and cross-sectional surface meshes;

(d) generate a volume mesh for tube 53 using the cross-sectional surface meshes of cross-sectional surfaces 59, 59', 59'', and 59''' and the envelop surface meshes of envelop surfaces 65, 65', and 65''; the volume mesh generated need to be conform with these cross-sectional surface meshes, as well as with these envelop surface meshes, i.e., nodes on the interfaces between this volume and these surfaces must coincide for all generated meshes;

(e) repeat steps (a) through (d) for tube 55 and its extension in tube 57; nodes at the interface of the volume already meshed in steps (a) through (d) and the volume meshed in the present step, i.e. at the envelop surfaces 65' and 65'', must coincide for both volumes adjacent to this interface surface;

(f) repeat steps (a) through (d) for tube 57; nodes at the interface of the volume already meshed in step (e) and the volume meshed in this step, i.e. at the envelop surface 67', must coincide for both volumes adjacent to this interface surface.

It is to be understood that FIG. 6 only shows the basic principles of generating the required mesh structure. Actually, there will be an aluminum (or other) profile 13 extending from the bearing 3, a die 2 surrounding the bearing 3 and the pocket 5, the container 8 surrounding the billet 7, and a ram 9 at the rear side of the billet 7 (FIG. 1). These structures will have to be added to the structure shown in FIG. 1. However, the same principles are followed: i.e. front and rear cross-sectional surface meshes, envelop meshes and volume meshes are generated in essentially the same way. If necessary, for instance for surfaces not being parallel to the extrusion direction P, corrections can be made as will be explained later. Again, a requirement is that nodes of meshes located on interface surfaces between different volumes are common to the volume meshes at opposing sides of the interface surfaces.

In the next paragraphs, it will be explained in detail how the mesh generator operates in accordance with these principles for the example of the aluminum profile already shown in cross-section in FIGS. 2, 4a and 4b.

Figure 7:
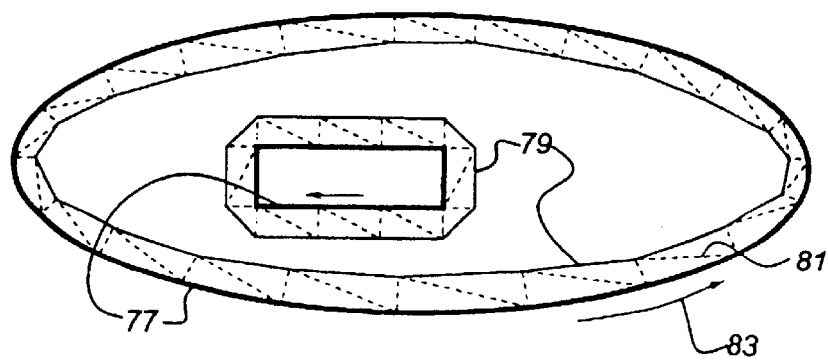
FIG. 7 shows the definition of permanent and current boundaries.

As shown in FIG. 7, the contours related to physical boundaries, such as the bearing opening, will be referred to as permanent boundaries 77 (Blacker and Stephenson, 1991). The permanent boundaries remain constant during mesh generation. The boundary between the ungridded domain and the gridded domain will be referred to as the current boundary 79. The current boundary 79 continuously evolves during mesh generation and eventually vanishes when the entire domain has been meshed.

For every node i on the permanent boundary 77 the starting thickness of the layers $t_i^o$ is prescribed. Also a growth factor $f_i$ is specified for every node (see FIG. 8). This growth factor indicates the ratio between the thickness $t_i^n$ of a layer n and the thickness $t_i^{n-1}$ of the previous layer n−1:

$$t_i^n = f_i \cdot t_i^{n-1} \qquad (2)$$

A directional refinement can then be achieved by setting the thickness in each node to a fraction of the length of the boundary line elements it is connected to. If this fraction is small, elements with a high aspect ratio will result.

1.2 Generating Triangles with the Current Boundary Nodes

Before adding nodal points to pave a subsequent layer 21 of elements a check is made to ensure that there is enough space between opposing parts of the current boundary 79 to add a new layer 21 of elements. If there is not enough space, adding a layer 21 would imply the generation of overlapping elements. To avoid overlapping elements, bridging triangles are added at these locations. By adding these triangles the current boundary 79 is altered such that no overlapping elements will be generated in a subsequent paving step. This approach ensures, as an added benefit, that no superfluous nodes 17 are generated.

The generation of new triangles using the current boundary nodes 17 is attempted by checking all the line segments on this boundary. For a line segment $e_i$ spanned by nodes i and i+1, triangles are generated by selecting as a third node j any of the other nodes 17 on the current boundary 79. The quality of all these triangles is evaluated. A triangle is considered to have an acceptable quality if all its corners are sharp and the distance h between the line segment $e_i$ and the node j satisfies:

$$k < \frac{t_i^n + t_{i+1}^n}{2} + t_j^n \quad (3)$$

Of all the triangles that are acceptable the aspect ratio, i.e. the longest edge length of the element divided by the shortest edge length, is assessed. The triangle with the lowest aspect ratio is then generated and the current boundary 79 is updated. This process is repeated until no more acceptable triangles can be generated.

1.3 Adding a Layer of Elements

In order to continue the meshing procedure, new nodes 17 have to be generated. These new nodes 17 are positioned at a distance $t_i^n$ along the normals associated with the existing nodes 17 on the current boundary 79. The normal in a node 17 is defined to be the average normal of the line segments connected to that node 17. Between the existing and the new nodes 17 quadrilaterals elements are constructed, which are subsequently divided into two triangles each (FIG. 7).

A slightly different procedure must be followed at sharp angles in the current boundary 79 in order to avoid distorted elements. Let $\alpha_i$ denote the angle between the normals $\vec{n}_{i-1}$ and $\vec{n}_i$ which belong to the line elements $e_{i-1}$ and $e_i$, respectively (see FIGS. 9a and 9b). For $\alpha_i > \pi/3$ the two new quads that share node i would become too distorted in node i. To prevent this, additional nodes are inserted (nodes j' and j" in FIGS. 9a and 9b). The number of additional nodes is given by $m = \alpha_i \div \pi/3$. This definition of m leads to a small number of extra nodes while maintaining an acceptable element shape. Generating elements using the additional nodes is straightforward.

1.4 Merging Nodes on the Current Boundary

To keep the mesh as efficient as possible the number of nodes 17 on the newly created boundary is reduced to a minimum by merging nodes 17 that are almost coincide Two nodes 17 are merged if the distance between the nodes 17 is less than the average layer thickness defined in these nodes 17. The replacing node 17 is positioned exactly between the two original nodes 17. Both the thickness and the growth factor in the new node 17 are the average of the values in the nodes 17 it replaces.

1.5 Smoothing the Mesh

After the entire domain has been gridded the quality of the mesh is improved by flipping and subsequent node shifting. Flipping is used to replace elements with large angles. To obtain a balance between meshing effort and mesh quality it is only performed on elements that contain a corner with an internal angle greater than $0.67\pi$. The process of element flipping consists of joining a triangle with that neighbouring triangle that shares the longest edge with the triangle to be flipped. These two triangles then form a quad; the common edge of the triangles is one of the diagonals of the quad. Next, the quad is split along the other diagonal to render two new triangles. Reference is made to 10 which shows flipping of an element with a bad corner (shaded).

If flipping does not improve the mesh, an attempt is made to shift the node 17 of the triangle in which the large angle occurs. The displacement of the node 17 should neither change the refinement direction of the mesh nor turn elements inside out. Therefore, a node 17 is only shifted if the polygon formed by the elements connected to that node 17 is convex. The node 17 is then moved to the geometrical centre of the polygon, as depicted in FIG. 11.

1.6 Resulting Meshes

In FIGS. 12a through 12d the meshes for the bearing 3, the pocket 5, the billet 7, and the ram 9, respectively, resulting from the procedure introduced above have been depicted for the example configuration of FIG. 2. It is observed that the scale of the billet 7 (FIG. 12c) and the ram 9 (FIG. 12d) differ from those of the bearing 3 (FIG. 12a) and the pocket 5 (FIG. 12b). The discretization of each contour is identical for every mesh it occurs in, i.e. nodes coincide there, which facilitates the meshing of the envelope surfaces. As can be seen, high aspect ratio triangles have been generated for the bearing to render many elements across the thickness of the extrusion profile because high gradients in the solution fields are to be expected there. The mesh of the ram surface is much coarser because near the ram 9 the gradients will be very low.

2 Meshing the Surfaces—Expansion Generator

The meshing of the envelope surfaces is performed in two steps. First, quads (quadrilaterals) are generated from the line segments in the discretized cross-section contours. Next, these quads are subdivided into triangles. This method of meshing requires that the discretizations of the two contours that bound the envelope are identical.

The quads are created by translating the line elements 15 by a prescribed distance to render a new discretized contour. The line elements 15 from the two contours are combined into quads, as shown in FIG. 13). This is repeated until the entire envelope surface is meshed with quads. By varying the translation distance between each contour, different levels of refinement can be obtained in the extrusion direction P.

To obtain a triangular surface mesh the quads have to be split into triangles. As indicated in FIG. 13 a quad can be split into two triangles in two different ways, depending on the choice of the orientation of the diagonal in the quad. Since, as a result of the rectangular shape of the quad, both orientations will render triangles with the same quality, either orientation is acceptable. The diagonals are therefore oriented such that their direction alternates for adjacent quads. This eliminates the mesh orientation that would result from setting all diagonals in the same direction.

Figure 14:
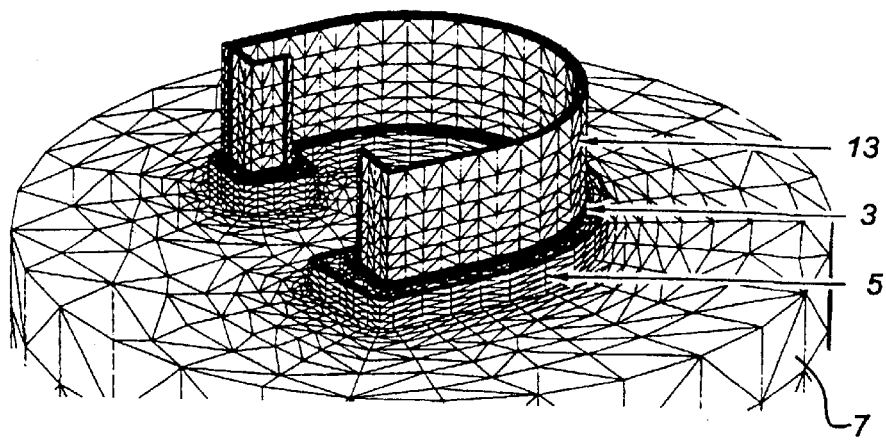
FIG. 14 shows a mesh of envelop surfaces.

In FIG. 14 the envelope and the cross-section surface meshes generated for the example problem are plotted. FIG. 14 shows the surface meshes for the extrusion profile 13, the bearing 3, the pocket 5 and the billet 7. In this figure the alternating orientation of the diagonals on the envelope surfaces can clearly be seen. It can also be observed that the mesh of the bearing envelope is more refined than the meshes of the extrusion profile and the pocket envelopes. This is done to appropriately capture the high gradients in the solution field in the bearing 3.

3 Meshing the Volumes—Expansion Generator

Of all the volumes that have to be filled with tetrahedral elements the volumes of the pocket 5, the bearing 3 and the extrusion profile 13 are discretized using the expansion mesh generator functions discussed in this section. The volumes of the billet 7 and the die 2 are meshed using the generator functions discussed in the next section. The expansion generator applied in this work generates tetrahedra (below called "tets") in two steps which will be treated in more detail in the following. First, prisms are created from the triangles in the cross-section meshes. Next, the prisms are subdivided into tetrahedra. The volumes that can be meshed with this expansion generator are restricted to volumes of which the top and the bottom surface have topologically equivalent meshes and of which the envelope surface has been created using the expansion surface generator dealt with in Section 2.

3.1 Generating Prisms

Figure 15:
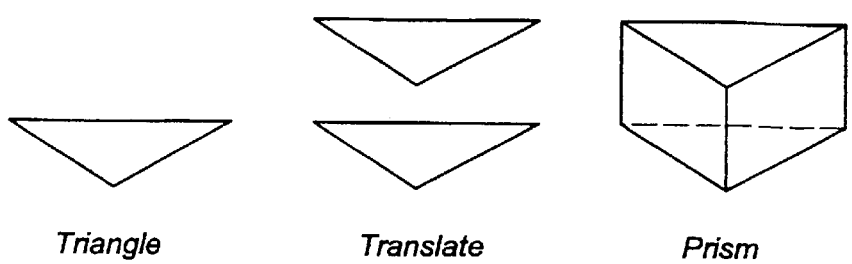
FIG. 15 shows the generation of prisms in a volume mesh generator.

The creation of the prisms is performed in a process similar to the creation of the quads in the envelope surfaces. Each triangle of the cross-section mesh is translated in the extrusion direction P to render a new cross-section mesh (see also FIG. 15). Subsequently, the triangles of both cross-section meshes are combined into prisms. The process of translating and combining is repeated until the entire volume is filled. To ensure that the nodes 17 on the contour of each cross-section coincide with the nodes 17 of the envelope mesh that encloses the volume, the distances over which the cross-section meshes are translated, are equal to the translation distances that have been used in the generation of the envelope mesh.

4.3.2 Generating Tetrahedra

Figure 16:
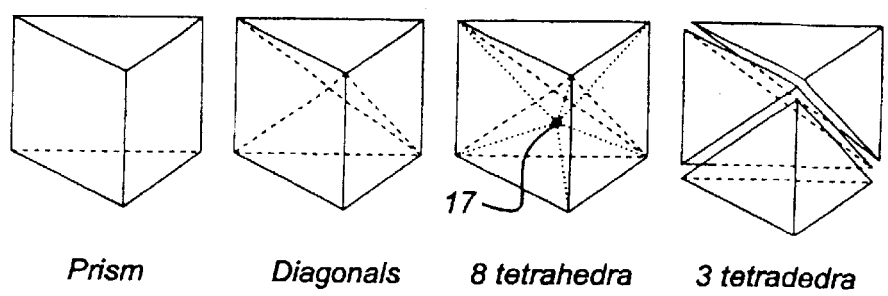
FIG. 16 shows splitting of a prism into 8 or 3 tetrahedra.

After the prisms have been generated they are split into tetrahedra. To do so, each rectangular face of a prism has to be split into two triangles. Reference is made to FIG. 16 which shows splitting of a prism into 8 or 3 tetrahedra. The split has to be performed such, that the diagonals introduced on the rectangular faces of two adjacent prisms have matching directions. This will be referred to as the matching-criterion.

With the diagonals set, each prism can be subdivided into tets using one of two paradigms. The first consists of introducing a node 17 in the baricenter of the prism. This node 17 then serves as the common top node 17 which, when combined with each of the 8 triangles on the sides of the prism, generates 8 tets. The second method entails the splitting of the prisms into 3 tets, without introducing an internal node 17 in each prism. The second method is applied in this work because it reduces the number of nodes 17 and elements. Furthermore, it can easily be verified that the worst aspect ratio of the elements that are created by applying the 3-tet split is always better than the worst aspect ratio of the elements that are obtained with the 8-tet split.

A disadvantage of the 3-tet split is that it imposes an extra requirement on the orientation of the diagonals of each prism. The orientation of the diagonals should not only match for adjacent prisms, but within one prism the diagonals should be oriented such that the 3-tet split is possible (L öhner, 1993). The 3-tet criterion dictates that both orientations of the diagonals should occur on the rectangular faces of an individual prism: see also FIG. 17 which shows a diagonal orientation with respect to the 3-tet criterion.

An iterative procedure is used to select the orientation of the diagonals in a pattern that meets the additional 3-tet requirement (Van Rens et al., 1998c). With the predefined diagonal orientations of the faces in the envelope mesh as a starting point a loop over the prisms is performed. For those prisms in which the orientation of the diagonal has been set for one or two rectangular faces, the orientation is set for one additional face. The orientation is chosen such that the diagonals of both this prism and of the adjacent prism obey the matching criterion and do not violate the 3-tet criterion. However, it is not possible to satisfy the matching criterion and the 3-tet criterion for both prisms in case both prisms already have two diagonals set and the 3-tet criterion in each prism requires non-matching diagonal orientations on their mutual face. In this case the orientation of the diagonal is set such that the current prism meets the 3-tet criterion, which implies that the adjacent prism obtains a diagonal configuration that does not satisfy the 3-tet criterion. The prisms with incorrect diagonal configurations are dealt with next. This loop is repeated until the diagonals of all the faces are set.

Due to the possible incompatibility between the matching and the 3-tet criterion described above, it is likely that the mesh contains prisms for which the 3-tet criterion is not satisfied. The orientation of the diagonals in these prisms is corrected as follows. For each prism that violates the 3-tet criterion the orientation of one of the diagonals is changed while the diagonal of the adjacent prism is altered accordingly to ensure that the matching criterion is not violated. Of the three rectangular faces in the incorrect prism on which the diagonal can be swapped that face is selected for which the adjacent prism still conforms to the 3-tet criterion after the swapping. If none of the adjacent prisms allow the swapping of a diagonal, the diagonal direction of one face is altered nevertheless, thus causing the 3-tet criterion to be violated in the prism adjacent to this face. Consequently, it is possible that after the alteration of the diagonal directions other prisms violate the 3-tet criterion. These prisms are identified by performing a new scan for incorrect prisms, which are adjusted in turn. This is repeated until all prisms satisfy the 3-tet criterion (typically 1 to 2 iterations are required). To avoid repetitions, the orientation of each diagonal can be altered only once in this process.

4 Meshing the Volumes—Unstructured Generator

The tetrahedral mesh of the billet 7 (or the die package) cannot be generated using the expansion generator discussed in Section 3 because this generator requires that the volume has topologically equivalent cross-section meshes on both ends of an envelope mesh. The mesh of the ram surface is much coarser than that of the combined bearing, pocket and billet surface. Therefore, an unstructured mesh generator is used to generate the tetrahedral mesh of the billet 7 (the die package is considered separately in Section 7).

It is beyond the scope of this document to give a detailed description of the unstructured mesh generator and therefore only the basic ideas are presented here. The unstructured mesh generator is based on ideas similar to the paving approach introduced in Section 1. It consists of the following steps:

(a) Process the input data
  Repeat
  (b) Generate tetrahedra using existing nodes 17 on the current boundary 79
  (c) Try to add one new node 17 to generate one new tetrahedron on success goto (b), else goto (d)
  (d) Apply Delaunay method to resolve complex areas
  (f) Smooth the mesh
  (g) Delete elements with unacceptable shape or size
  (h) Until entire domain is meshed
The concepts behind each of the steps will be discussed briefly.

4.1 Input Data

The input consists of the triangulation data for the volume boundary. As in the paving algorithm a distinction is made between the permanent, physical boundary and the current, constantly evolving boundary. Before elements have been generated the permanent and the current boundary 79 coincide. While elements are generated the current boundary 79 changes and eventually vanishes.

The triangulation of the permanent boundary 77 is used to compute the edge length distribution of the boundary mesh. The edge lengths on the boundary are interpolated inside the volume to obtain a field of desired edge lengths for the entire domain. This field of edge lengths is used to determine the coarseness of the mesh everywhere in the domain.

4.2 Generate Elements with the Current Boundary Nodes

Before adding new nodes 17 a check is made whether elements can be generated using the existing nodes 17 on the current boundary 79. This is done by considering all triangles on the current boundary 79. For each triangle, tets are generated by combining the triangle with all the other nodes 17 on the current boundary 79. For each tet, the lengths of the edges that connect the node 17 to the triangle are computed. Also, the angles between these edges and the triangle surface are determined. The edge lengths and angles are compared for every tet associated with one triangle. If at least one tet has edge lengths and angles that are acceptable the tet that is most resembling to an equilateral tet is generated. To determine whether the edge lengths of a new tet are acceptable, they are compared to the local desired edge length that is stored in the field computed in step (a), Section 4.1. The angles of a tet are acceptable if they are within preset limits. After a tet is generated the current boundary 79 is updated. Then the loop over the current boundary 79 is repeated until no additional tets can be generated.

4.3 Adding a Node to Generate a Tetrahedron

Figure 18:
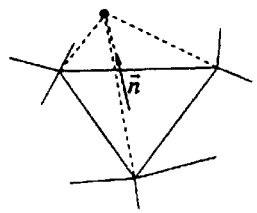
FIG. 18 shows the generation of a tet by adding a node.

If no more tets can be created from the current boundary 79 mesh a new node has to be generated to continue the meshing procedure. The new node 17 is created using a triangle in the current boundary 79 as basis (see also FIG. 18) and is positioned along the normal of the triangle that starts in the geometrical centre of the triangle. The position is selected such that the edges of the new tet between the triangle and the new node 17 have the desired length. If the new node 17 is positioned inside the unmeshed part of the domain, the node 17 and the tet are maintained and the current boundary 79 is updated. Then step (b) is repeated to generate elements with the updated current boundary 79. If the new node 17 is positioned inside an existing tet, the node 17 and the tet are discarded and the next triangle is used to create a new tet by adding a node 17. Ibis is repeated until a node 17 and tet have been generated or all triangles have been considered. If all the triangles have been tried and no new nodes 17 could be generated the current boundary 79 will be very complex. In this case a Delaunay mesh generator will be employed for the remaining unmeshed domain.

4.4 Applying the Delaunay Algorithm

Figure 17:
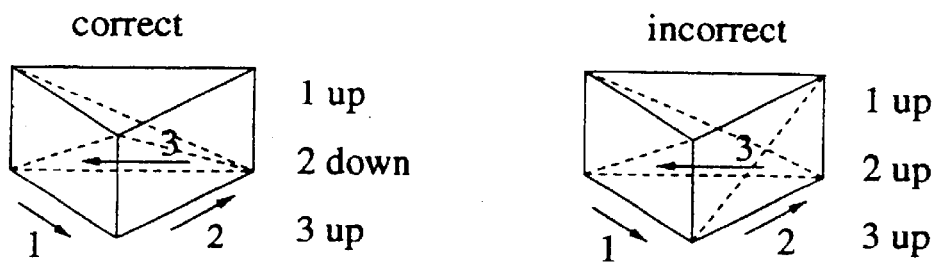
FIG. 17 shows a diagonal orientation with respect to the 3-tet criterion

The Delaunay algorithm is used to deal with complex current boundaries. For a detailed description of the Delaunay method the interested reader is referred to (Zheng et al., 1996) or (Joe, 199 1991) and references therein. Here it is only mentioned that the Delaunay method is capable of generating a tetrahedral mesh for almost any boundary triangulation without introducing additional nodes 17. One of the few cases for which it fails, is a boundary that is topologically equivalent to a prism with incorrect boundary orientations as depicted in FIG. 17. Then an additional node 17 has to be added to generate 8 tets. The major drawback of Delaunay's method is that it often generates elements with very poor aspect ratios. Therefore it is only used if the element generation algorithms in steps (b) and (c) have failed.

Figure 19:
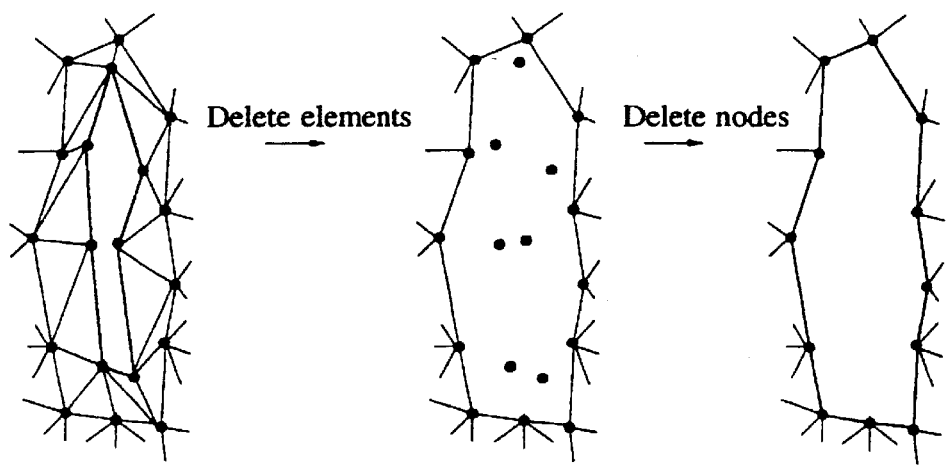
FIG. 19 shows removing current boundaries in the Delaunay algorithm.

The current boundary 79 is not used for the Delaunay algorithm because the region it encloses can be very slender, which may result in extremely deformed tets. Therefore the current boundary 79 is redefined by eliminating all the elements connected to nodes 17 on the current boundary 79 (see also FIG. 19 which shows removing of current boundaries). After the element elimination the nodes 17 that were on the current boundary 79 are no longer connected to any elements and are therefore deleted as well. Next, the Delaunay algorithm is applied to the redefined boundary.

4.5 Smoothing the Mesh

The mesh is smoothed to increase the quality of the tets. This smoothing is performed using a standard Lagrangian smoothing algorithm. This algorithm consists of a loop over all nodes 17 in the mesh. For each node 17 the polyhedron that is spanned by the elements connected to the node 17 is constructed. Then the node 17 is translated to the geometrical centre of that polyhedron. It should be noted that it is possible that elements become overlapping during this rather crude smoothing method. If this happens the inside-out elements are dealt with in the next step.

4.6 Deleting Unacceptable Elements

At the end of one meshing iteration two types of unacceptable elements can occur in the mesh. The first type of unacceptable elements are those elements that overlap other elements as a result of the node 17 repositioning during the smoothing of the mesh. Such elements are never acceptable and are all marked for deletion. The second type of unacceptable elements are those elements which have edge lengths that deviate too much from the locally desired edge length. Of all the elements that have unsuitable edge lengths only the worst element is marked for deletion.

The marked elements are deleted along with all the elements that share a node 17 with the marked elements. Since the nodes 17 of the marked elements are not connected to any elements anymore after the element deletion, these are deleted as well. The deletion of marked elements causes the reformation of a current boundary 79 which necessitates another meshing iteration. The mesh generation is terminated if no more elements have been marked for deletion.

4.7 Resulting Mesh of the Die Package

Figure 20A:
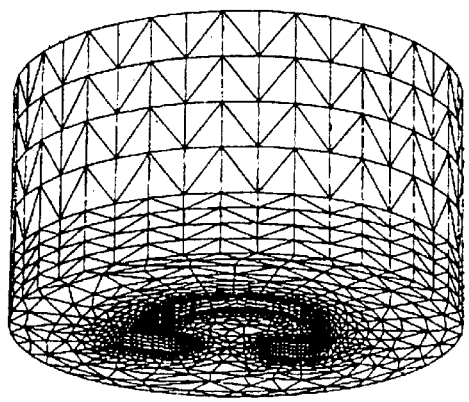
Figure 20B:
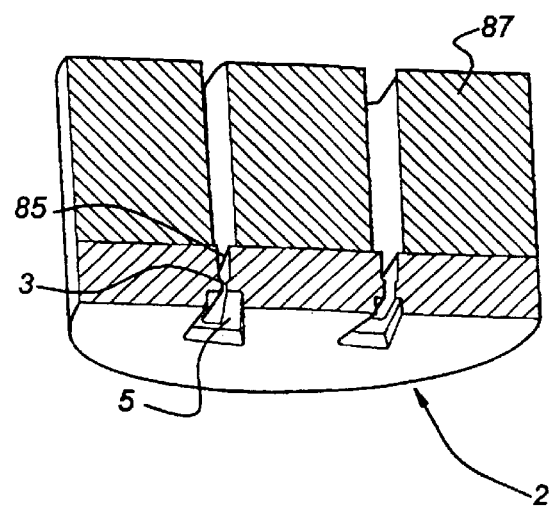

The mesh of the die package depicted in FIG. 20*a* has been generated using the unstructured mesh generator. An intersection of the die package is plotted in FIG. 20*b*. In the intersection plane of the die 2 the pocket 5, the bearing 3 and the outflow offset 85 can be identified. The outflow offset 85 ensures that the aluminum of an unbalanced profile does not touch the die 2 when the profile exits the die 2 under an angle.

The domain of the die 2 and the backer 87 are meshed separately. At the aluminum-die interface the surface mesh of the die domain is taken in conformity with the mesh of the aluminum surface to simplify the modelling of the interactions between these domains. Also, the surface mesh of the backer at the die-backer interface is identical to the surface mesh of the die 2 to simplify the discretization of the Lagrange multiplier that is used to model the frictionless contact between the die 2 and the backer 87. Since the gradients in the displacement field will be larger in the die domain than in the backer domain the element size in the die domain is smaller than in the backer domain.

5 Stretching the Bearing

In the example mesh generated in the previous sections the bearing 3 has a constant length in extrusion direction. However, in reality the bearing length varies along the bearing contour and numerical experiments indicate that the length of the bearing 3 has a significant influence on the outcome of the simulations (Van Rens et al., 1998d). Therefore, the constant bearing length mesh is adapted in a number of steps to incorporate the varying bearing length (Van Rens et al., 1998e). These steps are visualised in FIGS. 21a through 21f, but only for the bearing volume mesh. Of course, these operations are applied to the outflow volume mesh and the die mesh as well to ensure the meshes remain compatible. In each of the steps nodes 17 are translated in the extrusion direction while the topology of the mesh remains the same. This implies that different bearing lengths can be studied by repeating only the stretching operation, i.e. without having to generate a new mesh.

Figure 21A:
FIGS. 21a through 21f shows different steps carried out when stretching a calculated mesh for the bearing has to be stretched to correspond to the actual bearing.
Figure 21B:
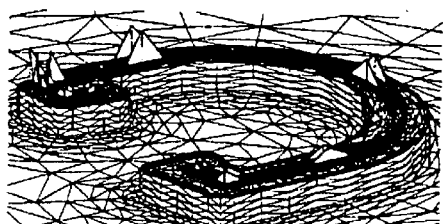

The mesh of the aluminum bearing volume with a constant bearing length, as depicted in FIG. 21a, serves as a point of departure. The length of the bearing 3 is only specified in a discrete number of control nodes 17 along the bearing contour and varies linearly between these nodes 17. In the first step the control nodes 17 are translated to the specified position, as shown in FIG. 21b.

Figure 21C:
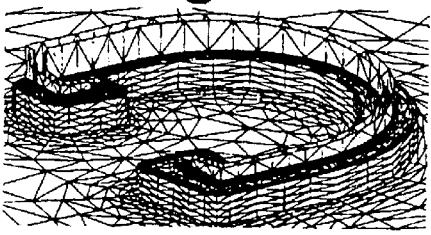

In the second step all the other nodes 17 on the contour are translated to the real bearing geometry. The translation distance for these nodes 17 is computed by a linear interpolation between the control nodes 17, as shown in FIG. 21c. The linear interpolation is performed by solving a diffusion problem on the line segments that constitute the contour of the bearing 3. In this diffusion problem the translation distances are computed by prescribing the bearing lengths in the control points as Dirichlet boundary conditions.

Figure 21D:
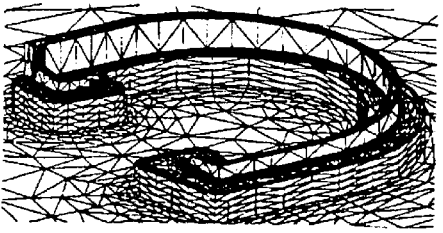

It can be seen in FIG. 21c that the cross-section surface that separates the aluminum bearing volume from the outflow volume has become very distorted. Therefore, in the third step, this surface is smoothed by repositioning the nodes 17 that belong to this surface, as shown in FIG. 21d. Many methods exist to compute the distance over which the surface nodes 17 have to be translated (see e.g. (Tezduyar et al., 1992) and (Johnson and Tezduyar, 1994)). Here, it is obtained in the same manner as in the previous step, by solving a diffusion problem on the surface. In this problem the translation distances for the surface are computed, using Dirichlet boundary conditions to prescribe the previously computed translation distances on the bearing contour.

Figure 21E:
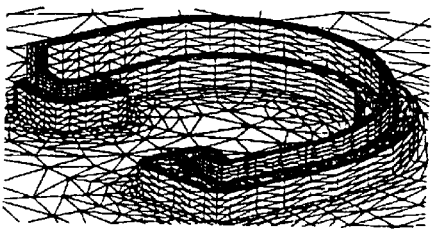
Figure 21F:
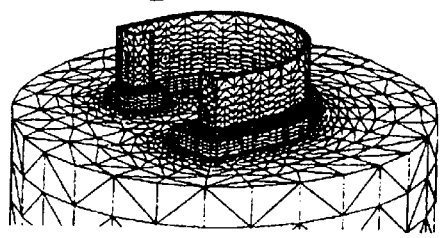

Lastly, in the fourth step, the volume mesh of the bearing 3 is smoothed by translating the nodes 17 in this volume, as shown in FIG. 21e. Again, the translation distances for the nodes 17 in the volumes are obtained by solving a diffusion problem for the bearing volume. In this diffusion problem the previously computed translation distances of the cross-section surface are imposed as Dirichlet boundary conditions. When both the bearing and the outflow meshes are plotted after the stretching, FIG. 21f is obtained that shows the final mesh including the extrusion profile.

4.6 Extension to Hollow Dies

Figure 22A:
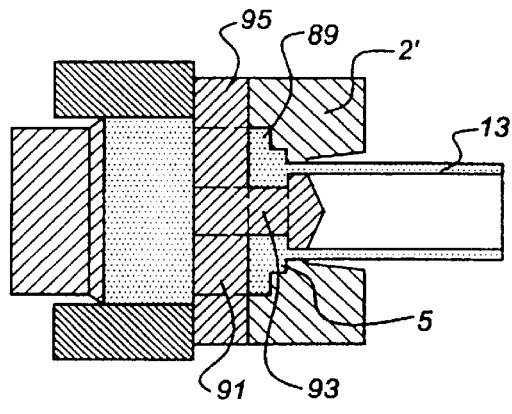
FIGS. 22a and 22b show cross-sections through a die tool arranged for the extrusion of hollow profiles and a bridge part of such a die tool, respectively.
Figure 22B:
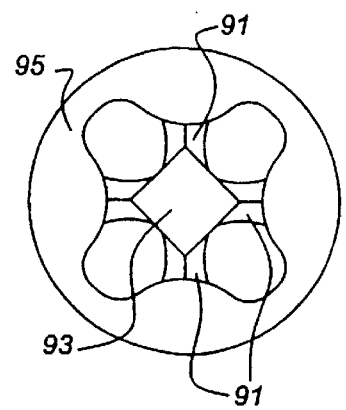
Figure 23A:
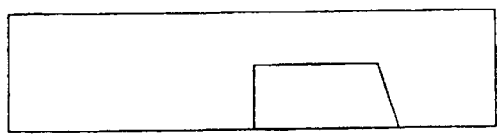
FIGS. 23a through 23f show how mesh elements are removed in different steps in the case of extrusion of hollow profiles.
Figure 23B:
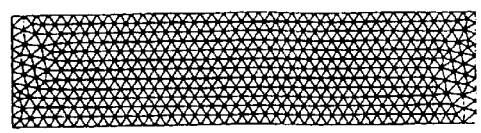
Figure 23C:
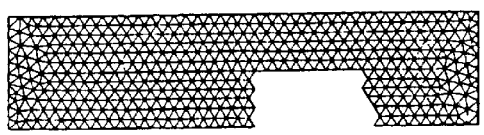
Figure 23D:
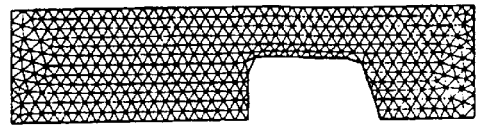
Figure 23E:
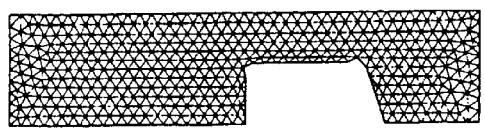
Figure 23F:
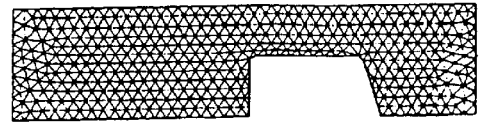

For hollow profiles the shape of the aluminum domain is considerably more complicated than for flat profiles. This is caused by the fact that the die is constructed out of two parts, instead of one. This is shown in FIGS. 22a and 22b. The first part is the die plate 2' which determines the external contour of the profile 13. In the die plate 2' a welding chamber 89 is added to allow the aluminum flow, that has split to pass legs 91 of a second part, i.e. a bridge part 95, to weld together again before entering the pocket 5 of the die. The second part, the bridge part 95, consists of a core 93 that determines the internal contour of the profile 13 and the legs 91 which support the core 93.

The core 93 and the die plate 2' consist of surfaces that are either perpendicular or tangential to the extrusion direction. This implies that they can be meshed with the methods described earlier in this document. However, as can be seen in FIGS. 22a and 22b, the complex geometry of the legs 91 cannot be described with just perpendicular or tangential surfaces. Therefore, the meshing of the aluminum domain associated with hollow profiles is performed in several steps. See FIGS. 23a through 23f which shows removing of elements in four steps:

(a) The aluminum geometry is constructed taking only the geometry of the core 93 into account. The geometry of the legs 91 is described separately.

(b) The aluminum geometry is meshed, incorporating the geometry of the core 93 but neglecting the geometry of the legs 91, using the methods discussed in the previous sections.

(c) The elements of which all nodes 17 are positioned inside the geometry of the legs 91 are removed.

(d) After the removal of the elements a set of external faces has been generated. These newly formed external faces are connected to nodes 17 that are inside the legs 91. These nodes 17 are translated onto the surface of the legs 91. During the translation the new positions of the nodes 17 are determined such that they do not cause elements to become overlapping. The translation is followed by a local smoothing of the mesh around the translated nodes 17. To realise this, the elements that are connected to newly formed external faces are marked. The nodes 17 of these elements that are not connected to external faces are repositioned to increase the quality of the elements.

(e) It is possible that near sharp edges some elements intersect the legs 91, even though their nodes 17 are on or outside the boundary of the legs 91. Therefore, the elements that have their geometrical centre inside the geometry of the legs 91 are deleted. The number of elements deleted in this step is generally very small.

(f) The translation of step (d) is repeated. In this case the newly formed external faces are connected to nodes 17 that are positioned on or outside the geometry of the legs and these nodes 17 have to be translated onto the surface of the legs as well.

Figure 24A:
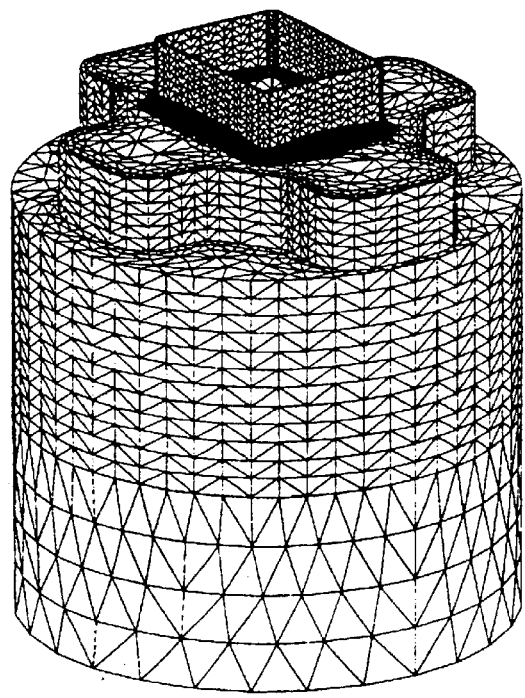
FIG. 24a shows an initial mesh and FIG. 24b final mesh during generating an aluminum domain mesh for a rectangular hollow profile.
Figure 24B:
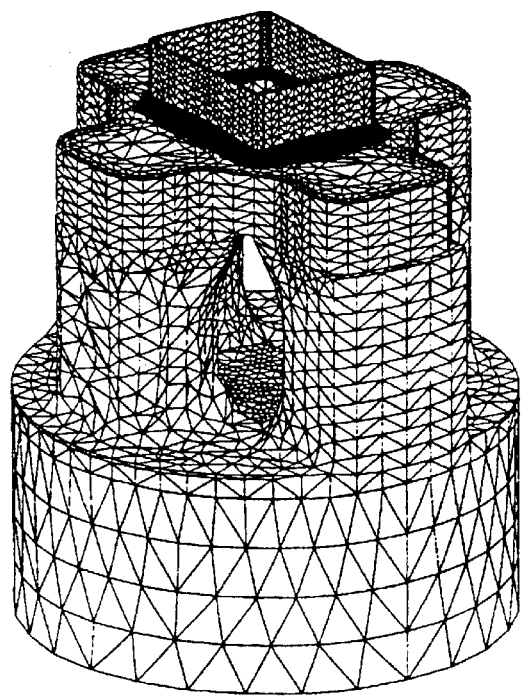

In FIGS. 24a and 24b an example is given of an initial and final mesh belonging to the aluminum domain of a rectangular hollow profile.

Above, the principles of generating meshes of simple and complex profiles has been explained with reference to an extrusion process. However, the mesh generator described can be used in any other method for simulating physical behaviour of an object by means of a finite element analysis.

What is claimed is:

1. A computer arrangement for generating a mesh structure for an object, the object having an object volume enclosed by a front surface (59), a rear surface (59') and an envelop surface (65), the front surface (59) having a front surface cross-section and the rear surface (59') having a rear surface cross-section substantially identical to the front surface cross-section, the computer arrangement being arranged for:

(a) receiving input data regarding a set of line sections (25(n)) together defining the front surface cross-section;

(b) defining a circle with a radius $L_{circ}$, said radius $L_{circ}$ being just large enough to enclose an outer contour of the front surface cross-section;

(c) dividing each of the line sections (25(n)) into a number of consecutive line elements connected by nodes (17) in accordance with the following equation:

$$n_{el}(n) = \left(c_1 \cdot \frac{L_{sect}(n)}{L_{circ}}\right)^{c_2} \quad (1)$$

where:
$n_{el}(n)$=number of line elements of line section 25(n) (n=1, 2, ..., N)
$L_{sect}(n)$=length of line section 25(n)
$c_1$=a first predetermined constant
$c_2$=a second predetermined constant (d) generating a front surface mesh using the line elements and nodes generated in step (c);

(e) copying the front surface mesh to the rear surface (59') to generate a rear surface mesh;

(f) generating an envelop surface mesh for the envelop surface (65) such that the envelop surface mesh is conform with the front surface mesh and with the rear surface mesh;

(g) generating a volume mesh for the object volume such that the volume mesh is conform with the front surface mesh, the rear surface mesh and the envelop surface mesh.

2. A computer arrangement according to claim 1, wherein $c_1$ and $c_2$ are defined by:

$$10 \leq c_1 \leq 200$$
$$0.5 \leq c_2 \leq 1.0.$$

3. A computer arrangement according to claim 1, wherein $n_{el} \geq 1$, and if $n_{el}$ as calculated by equation (1) is not an integer value it is made equal to a next higher integer value.

4. A computer arrangement for generating a mesh structure for a plurality of objects including at least a first (53) and a last (57) object, each object having an object volume defined by a front surface (59; 61; 63), a rear surface (59'''; 61''; 63') and an envelop surface (65, 65', 65''; 67, 67'; 69), the front surface (59; 61; 63) having a front surface cross-section and the rear surface (59'''; 61''; 63') having a rear surface cross-section substantially identical to the front surface cross-section, the computer arrangement being arranged for:

(a) receiving input data regarding a set of line sections (25(n)) together defining the front surface cross-section of the first object;

(b) defining a circle with a radius $L_{circ}$, said radius $L_{circ}$ being just large enough to enclose an outer contour of the front surface cross-section of the first object;

(c) dividing each of the line sections (25(n)) into a number of consecutive line elements connected by nodes (17) in accordance with the following equation:

$$n_{el}(n) = \left(c_1 \cdot \frac{L_{sect}(n)}{L_{circ}}\right)^{c_2} \quad (1)$$

where:
$n_{el}(n)$=number of line elements of line section 25(n) (n=1, 2, ..., N)
$L_{sect}(n)$=length of line section 25(n)
$c_1$=a first predetermined constant
$c_2$=a second predetermined constant (d) generating front surface meshes for the first object using the line elements and nodes generated in step (c);

(e) copying front surface meshes of the first object to the rear surface (59') of the first object to generate a rear surface mesh;

(f) generating an envelop surface mesh for the envelop surface (65) of the first object such that the envelop surface mesh is conform with the front surface mesh and with the rear surface mesh of the first object;

(g) generating a volume mesh for the object volume of the first object such that the volume mesh is conform with the front surface mesh, the rear surface mesh and the envelop surface mesh of the first object;

(h) repeating steps (a) through (g) for those surfaces and volumes of all other objects not already meshed, such that meshes generated for volumes of different objects and located on interface surfaces between these volumes are conform.

5. A computer arrangement according to claim 4, wherein the plurality of objects are arranged such that the first object is at least partly enclosed by a second object, and all following objects at least partly enclose a prior object.

6. A computer arrangement according to claim 4, wherein the plurality of objects relate to a bearing (3) of an extrusion tool (1) and a billet (7) of a material to be extruded.

7. A computer arrangement according to claim 6, wherein the plurality of objects also relate to a pocket (5) of an extrusion tool (1) located between said bearing (3) and said billet (5).

8. A computer arrangement according to claim 6, wherein said plurality of objects relate to a die (2; 2') enclosing said bearing (3) and a container (8) enclosing said billet (5).

9. A computer arrangement according to claim 8, wherein said bearing (3) has an unequal length of its bearing envelop surface in an extrusion direction (P) and the computer arrangement is provided with a stretching algorithm to stretch meshes of the bearing envelop surface.

10. A computer arrangement according to claim 6, wherein said plurality of objects also relate to a ram (9) for pushing said billet in an extrusion direction (P).

11. A computers arrangement according to claim 9, wherein said plurality of objects also relate to a bridge part (95) between said die (2') and said container (8), said bridge part comprising legs (91) connected to one another by a core (93) such that hollow profiles may be extruded.

12. A computer arrangement according to claim 11, wherein said legs (91) have envelop surfaces not being parallel in an extrusion direction (P), said computer arrangement being therefore arranged to mesh all objects neglecting the legs (91), to remove mesh elements of which nodes are located inside said legs (91) and carrying out a smoothing algorithm to smooth meshes located on outside boundaries of said legs (91).

13. A computer arrangement according to claim 4, wherein at least one object has coarser meshes than an adjacent object, and the computer arrangement is provided with an unstructured mesh generating algorithm to calculate meshes for said adjacent object.

14. A computer arrangement according to claim 4, wherein $c_1$ and $c_2$ are defined by:

$$10 \leq c_1 \leq 200$$
$$0.5 \leq c_2 \leq 1.0.$$

15. A computer arrangement according to claim 4, wherein $n_{el} \geq 1$, and if $n_{el}$ as calculated by equation (1) is not an integer value it is made equal to a next higher integer value.

16. A method for generating with a computer arrangement a mesh structure for an object, the object having an object volume enclosed by a front surface (59), a rear surface (59') and an envelop surface (65), the front surface (59) having a front surface cross-section and the rear surface (59') having a rear surface cross-section substantially identical to the front surface cross-section, the method including the following steps:

(a) receiving input data regarding a set of line sections (25(n)) together defining the front surface cross-section;

(b) defining a circle with a radius $L_{circ}$, said radius $L_{circ}$ being just large enough to enclose an outer contour of the front surface cross-section;

(c) dividing each of the line sections (25(n)) into a number of consecutive line elements connected by nodes (17) in accordance with the following equation:

$$n_{el}(n) = \left( c_1 \cdot \frac{L_{sect}(n)}{L_{circ}} \right)^{c_2} \quad (1)$$

where:
$n_{el}(n)$=number of line elements of line section 25(n) (n=1, 2, . . . , N)
$L_{sect}(n)$=length of line section 25(n)
$c_1$=a first predetermined constant
$c_2$=a second predetermined constant (d) generating affront surface mesh using the line elements and nodes generated in step (c);

(e) copying the front surface mesh to the rear surface (59') to generate a rear surface mesh;

(f) generating an envelop surface mesh for the envelop surface (65) such that the envelop surface mesh is conform with the front surface mesh and with the rear surface mesh;

(g) generating a volume mesh for the object volume such that the volume mesh is conform with the front surface mesh, the rear surface mesh and the envelop surface mesh.

17. A method for generating with a computer arrangement a mesh structure for a plurality of objects including at least a first (53) and a last (57) object, each object having an object volume defined by a front surface (59; 61; 63), a rear surface (59'''; 61''; 63') and an envelop surface (65, 65', 65''; 67, 67'; 69), the front surface (59; 61; 63) having a front surface cross-section and the rear surface (59'''; 61''; 63') having a rear surface cross-section substantially identical to the front surface cross-section, the method including the following steps:

(a) receiving input data regarding a set of line sections (25(n)) together defining the front surface cross-section of the first object;

(b) defining a circle with a radius $L_{circ}$, said radius $L_{circ}$ being just large enough to enclose an outer contour of the front surface cross-section of the first object;

(c) dividing each of the line sections (25(n)) into a number of consecutive line elements connected by nodes (17) in accordance with the following equation:

$$n_{el}(n) = \left( c_1 \cdot \frac{L_{sect}(n)}{L_{circ}} \right)^{c_2} \quad (1)$$

where:
$n_{el}(n)$=number of line elements of line section 25(n) (n=1, 2, . . . , N)
$L_{sect}(n)$=length of line section 25(n)
$c_1$=a first predetermined constant
$c_2$=a second predetermined constant (d) generating front surface meshes for the first object using the line elements and nodes generated in step (c);

(e) copying front surface meshes of the first object to the rear surface (59') of the first object to generate a rear surface mesh;

(f) generating an envelop surface mesh for the envelop surface (65) of the first object such that the envelop surface mesh is conform with the front surface mesh and with the rear surface mesh of the first object;

(g) generating a volume mesh for the object volume of the first object such that the volume mesh is conform with the front surface mesh, the rear surface mesh and the envelop surface mesh of the first object;

(h) repeating steps (a) through (g) for those surfaces and volumes of all other objects not already meshed, such that meshes generated for volumes of different objects and located on interface surfaces between these volumes are conform.

18. A computer program product comprising computer executable instructions for generating a mesh structure for an object, the object having an object volume enclosed by a front surface (59), a rear surface (59') and an envelop surface (65), the front surface (59) having a front surface cross-section and the rear surface (59') having a rear surface cross-section substantially identical to the front surface cross-section, in accordance with the following steps:

(a) receiving input data regarding a set of line sections (25(n)) together defining the front surface cross-section;

(b) defining a circle with a radius $L_{circ}$, said radius $L_{circ}$ being just large enough to enclose an outer contour of the front surface cross-section;

(c) dividing each of the line sections (25(n)) into a number of consecutive line elements connected by nodes (17) in accordance with the following equation:

$$n_{el}(n) = \left( c_1 \cdot \frac{L_{sect}(n)}{L_{circ}} \right)^{c_2} \quad (1)$$

where:
$n_{el}(n)$=number of line elements of line section 25(n) (n=1, 2, . . . , N)
$L_{sect}(n)$=length of line section 25(n)
$c_1$=a first predetermined constant
$c_2$=a second predetermined constant (d) generating a front surface mesh using the line elements and nodes generated in step (c);

(e) copying the front surface mesh to the rear surface (59') to generate a rear surface mesh;

(f) generating an envelop surface mesh for the envelop surface (65) such that the envelop surface mesh is conform with the front surface mesh and with the rear surface mesh;

(g) generating a volume mesh for the object volume such that the volume mesh is conform with the front surface mesh, the rear surface mesh and the envelop surface mesh.

19. A data carrier provided with a computer program product as claimed in claim 18.

20. A computer program product comprising computer executable instructions for generating a mesh structure for a plurality of objects including at least a first (53) and a last (57) object, each object having an object volume defined by a front surface (59; 61; 63), a rear surface (59'''; 61"; 63') and an envelop surface (65, 65', 65"; 67, 67'; 69), the front surface (59; 61; 63) having a front surface cross-section and the rear surface (59'''; 61"; 63') having a rear surface cross-section substantially identical to the front surface cross-section, according to the following steps:

(a) receiving input data regarding a set of line sections (25(n)) together defining the front surface cross-section of the first object;

(b) defining a circle with a radius $L_{circ}$, said radius $L_{circ}$ being just large enough to enclose an outer contour of the front surface cross-section of the first object;

(c) dividing each of the line sections (25(n)) into a number of consecutive line elements connected by nodes (17) in accordance with the following equation:

$$n_{el}(n) = \left(c_1 \cdot \frac{L_{sect}(n)}{L_{circ}}\right)^{c_2} \quad (1)$$

where:

$n_{el}(n)$=number of line elements of line section 25(n) (n=1, 2, . . . , N)

$L_{sect}(n)$=length of line section 25(n)

$c_1$=a first predetermined constant $c_2$=a second predetermined constant (d) generating front surface meshes for the first object using the line elements and nodes generated in step (c);

(e) copying front surface meshes of the first object to the rear surface (59') of the first object to generate a rear surface mesh;

(f) generating an envelop surface mesh for the envelop surface (65) of the first object such that the envelop surface mesh is conform with the front surface mesh and with the rear surface mesh of the first object;

(g) generating a volume mesh for the object volume of the first object such that the volume mesh is conform with the front surface mesh, the rear surface mesh and the envelop surface mesh of the first object;

(h) repeating steps (a) through (g) for those surfaces and volumes of all other objects not already meshed, such that meshes generated for volumes of different objects and located on interface surfaces between these volumes are conform.

21. A data carrier provided with a computer program product as claimed in claim 20.

* * * * *